(12) United States Patent
Simons

(10) Patent No.: US 9,928,391 B1
(45) Date of Patent: Mar. 27, 2018

(54) APPARATUS AND ASSOCIATED METHOD

(71) Applicant: NXP B.V.

(72) Inventor: Sven Simons, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/703,810

(22) Filed: Sep. 13, 2017

(30) Foreign Application Priority Data

Nov. 25, 2016 (EP) .................................. 16200810

(51) Int. Cl.
*G07C 9/00* (2006.01)
*G06K 7/10* (2006.01)
*H04B 5/00* (2006.01)

(52) U.S. Cl.
CPC ..... *G06K 7/10237* (2013.01); *G07C 9/00309* (2013.01); *G07C 9/00714* (2013.01); *H04B 5/0012* (2013.01); *H04B 5/0037* (2013.01); *H04B 5/0062* (2013.01); *G07C 2209/10* (2013.01)

(58) Field of Classification Search
CPC ............ G06K 7/10237; G07C 9/00309; G07C 2209/10; G07C 9/00714; H04B 5/0012; H04B 5/0037; H04B 5/0062
See application file for complete search history.

(56) References Cited

U.S. PATENT DOCUMENTS

| | | | |
|---|---|---|---|
| 7,602,080 B1 * | 10/2009 | Hadar .................... | H02J 3/385 307/19 |
| 7,692,529 B2 | 4/2010 | Hagl et al. | |
| 9,397,505 B2 * | 7/2016 | Lee ......................... | H02J 5/005 |
| 2002/0160713 A1 * | 10/2002 | Flaxl .................... | G06K 7/0008 455/41.1 |
| 2004/0227619 A1 * | 11/2004 | Watanabe .......... | G06K 19/0701 340/10.34 |
| 2006/0187049 A1 | 8/2006 | Moser et al. | |
| 2008/0180219 A1 * | 7/2008 | Fischer .............. | G06K 7/10019 340/10.1 |

(Continued)

FOREIGN PATENT DOCUMENTS

WO 2013/063493 A1 5/2013

*Primary Examiner* — Thomas Alunkal
(74) *Attorney, Agent, or Firm* — Rajeev Madnawat

(57) ABSTRACT

An apparatus comprising a power providing arrangement for a field powered device having a coil antenna for receiving a wireless signal, the power providing arrangement comprising:

Figure 1:
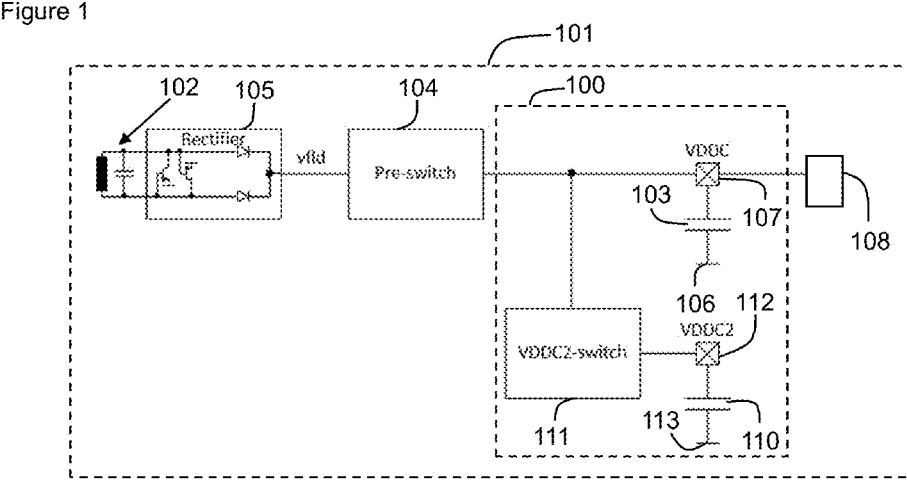

a first capacitor configured to be coupled to the coil antenna, the first capacitor configured to store energy obtained from the wireless signal received by the coil antenna, up to a first stored energy level, and configured to provide said energy to power the field powered device;

a second capacitor arranged in parallel with the first capacitor via a switch;

the switch providing at least a connected state in which the first capacitor and the second capacitor are connected in parallel and configured to both store the energy obtained from the wireless signal up to a second stored energy level, greater than the first stored energy level, and configured to provide said energy to power the field powered device and a disconnected state in which the second capacitor is disconnected from the first capacitor;

the switch configured to transition from the disconnected state to the connected state based on particular signalling received from a remote device.

15 Claims, 2 Drawing Sheets

(56) References Cited

U.S. PATENT DOCUMENTS

| | | | |
|---|---|---|---|
| 2012/0062203 A1* | 3/2012 | Kim | H02J 7/0024 323/304 |
| 2012/0161531 A1* | 6/2012 | Kim | H02J 7/0004 307/104 |
| 2012/0299557 A1* | 11/2012 | Kwon | H02J 5/005 320/166 |
| 2013/0020880 A1* | 1/2013 | Asai | H02J 7/34 307/109 |
| 2014/0049378 A1* | 2/2014 | Randjelovic | G06K 19/0701 340/10.1 |
| 2017/0033577 A1* | 2/2017 | Ueno | H02J 7/0029 |

* cited by examiner

Figure 3

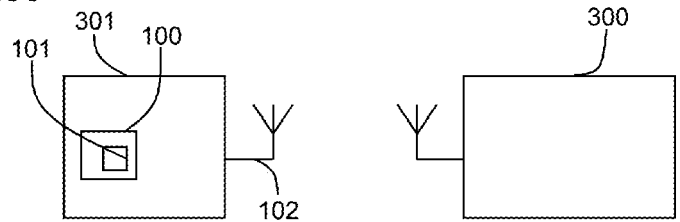

Figure 4

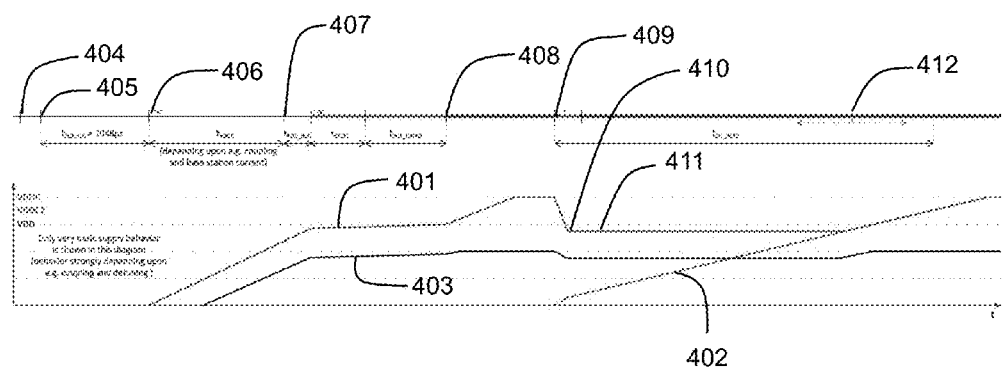

Figure 5

501 providing for the charging of a first capacitor from a wireless signal received by a coil antenna, up to a first stored energy level, for providing energy to power a field powered device 502 based on particular signalling received from a remote device; providing for transition of a switch from a disconnected state to a connected state, wherein in the connected state the first capacitor and a second capacitor are connected in parallel and configured to both store the energy obtained from the wireless signal, up to a second stored energy level, greater than the first stored energy level, for providing said energy to power the field powered device, and wherein in the disconnected state the second capacitor is disconnected from the first capacitor

APPARATUS AND ASSOCIATED METHOD

CROSS-REFERENCE TO RELATED APPLICATIONS

This application claims the priority under 35 U.S.C. § 119 of European Patent application no. 16200810.6, filed on Nov. 25, 2016, the contents of which are incorporated by reference herein.

The present disclosure relates to a power providing arrangement for a field powered device.

A field powered devices may use the energy of an externally generated field, i.e. a wireless signal, to provide power to its circuitry for operation. The field powered device may be required to communicate with different protocols which may each demand different energy requirements of the circuitry of the field powered device.

According to a first aspect of the present disclosure there is provided an apparatus comprising a power providing arrangement for a field powered device having a coil antenna for receiving a wireless signal, the power providing arrangement comprising:
  a first capacitor configured to be coupled to the coil antenna, the first capacitor configured to store energy obtained from the wireless signal received by the coil antenna, up to a first stored energy level, and configured to provide said energy to power the field powered device;
  a second capacitor arranged in parallel with the first capacitor via a switch;
  the switch providing at least a connected state in which the first capacitor and the second capacitor are connected in parallel and configured to both store the energy obtained from the wireless signal up to a second stored energy level, greater than the first stored energy level, and configured to provide said energy to power the field powered device and a disconnected state in which the second capacitor is disconnected from the first capacitor;
  the switch configured to transition from the disconnected state to the connected state based on particular signalling received from a remote device.

Thus, in one or more examples, the first capacitor (such as when the second capacitor is storing less energy than the first capacitor) provides for the storage of energy to enable the field powered device to provide for communication using a first protocol, such as by load modulation of one or more wireless signals received by the coil antenna. In one or more examples, the first and second capacitor, when connected, provide for storage of more energy to enable the field powered device to communicate using a second protocol, which may require actively transmitting a wireless signal. In one or more examples, the connected state may be considered to provide a second protocol communication (or active transmission) state of the field powered device and the disconnected state may be considered to provide a first protocol communication (or load modulation) state of the field powered device.

In one or more embodiments, the switch is further configured to provide a current-limited-connected state in which the first capacitor and the second capacitor are connected in parallel and configured to both store the energy obtained from the wireless signal and wherein energy flow between the first capacitor and the second capacitor is controlled based on a minimum-voltage threshold of the first capacitor; and wherein the connected state comprises a state without said control of the energy flow.

In one or more embodiments, the switch is configured to transition between the current-limited-connected state and the connected state based on a voltage of the second capacitor reaching a threshold voltage level.

In one or more embodiments, the switch is configured to transition between the current-limited-connected state and the connected state based on;
  (a) a voltage of the second capacitor reaching or exceeding a threshold voltage level; or
  (b) a control signal from the field powered device.

In one or more embodiments, the transition between the current-limited-connected state and the connected state based on the voltage of the second capacitor reaching the threshold voltage level is provided for by a Schmitt trigger.

In one or more embodiments, the switch includes a pair of transistor switches and the connected state is provided by a closed state of both the transistor switches, the disconnected state is provided by an open state of both the transistor switches and the current-limited-connected state is provided by control of a voltage dependent conductance of a current path through the transistor switches.

In one or more embodiments, the switch includes a self-locking module configured to prevent transition of the switch to the connected state when a voltage at the second capacitor is greater than the voltage at the first capacitor.

In one or more embodiments, the switch is absent of a timer to control the transition between the current-limited connected state and the connected state.

In one or more embodiments, the particular signalling comprises a request from a remote device to the field powered device to use a charge and talk protocol.

According to a second aspect of the present disclosure there is provided a field powered device comprising the power providing arrangement of any preceding claim, the field powered device configured to provide for the wireless transmittal of one or more signals in accordance with a first protocol when the switch is in the disconnected state and configured to provide for the wireless transmittal of one or more signals in accordance with a second, different protocol when the switch is in the connected state.

In one or more embodiments, the field powered device is configured to operate in;
  a load modulation protocol mode in which the switch is in the disconnected state and the one or more wireless signals are transmitted by load modulation;
  a charge and talk protocol mode in which the switch is in the connected state and the one or more wireless signals comprise signals in accordance with charge and talk protocol.

In one or more embodiments, the field powered device is configured to provide for the wireless transmittal of one or more signals in accordance with the first protocol when the switch is in the current-limited-connected state.

In one or more embodiments, the field powered device is configured to, based on the second capacitor having energy stored therein when the switch is in the disconnected state, provide for switching of the switch to the connected state to provide power to the field powered device based on energy stored in the second capacitor, the field powered device configured to use said energy to provide for wireless transmittal of one or more signals in accordance with the first or second protocol.

Thus, in one or more examples, the presence of any remaining energy in the second capacitor may be used to provide power for first or second protocol communication, which may comprise load modulation, which would, in normal operation, be provided by energy accumulated by the first capacitor. The use of the remaining energy in the second capacitor may, in one or more examples, provide for faster operation for first protocol (e.g. load modulation) communication in comparison to the time taken for the first capacitor to accumulate sufficient energy from the wireless signal to provide the required power to the field powered device.

According to a third aspect of the present disclosure there is provided an automotive immobilizer fob comprising the field powered device of the second aspect.

According to a fourth aspect of the present disclosure there is provided a method comprising:
    providing for the charging of a first capacitor from a wireless signal received by a coil antenna, up to a first stored energy level, for providing energy to power a field powered device; and
    based on particular signalling received from a remote device;
    providing for transition of a switch from a disconnected state to a connected state, wherein in the connected state the first capacitor and a second capacitor are connected in parallel and configured to both store the energy obtained from the wireless signal, up to a second stored energy level, greater than the first stored energy level, for providing said energy to power the field powered device, and wherein in the disconnected state the second capacitor is disconnected from the first capacitor.

Thus, in the disconnected state, the second capacitor may not receive the energy from the one or more wireless signals received by coil antenna.

According to a fifth aspect of the present disclosure there is provided an remote device for communicating with the field powered device of the second aspect, the remote device configured to provide for transmission of the particular signalling to request that the field powered device communicates therewith using a second protocol different to a default, first protocol used by the field powered device, the particular signalling configured to provide for the actuation of a switch of the field powered device to provide for the storage of energy from one or more wireless signals transmitted by the remote device by at least one additional capacitor compared to prior to transmission of the particular signalling.

It will be appreciated that the remote device is "remote" in terms of it being remote from the field powered device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

Figure 2A:
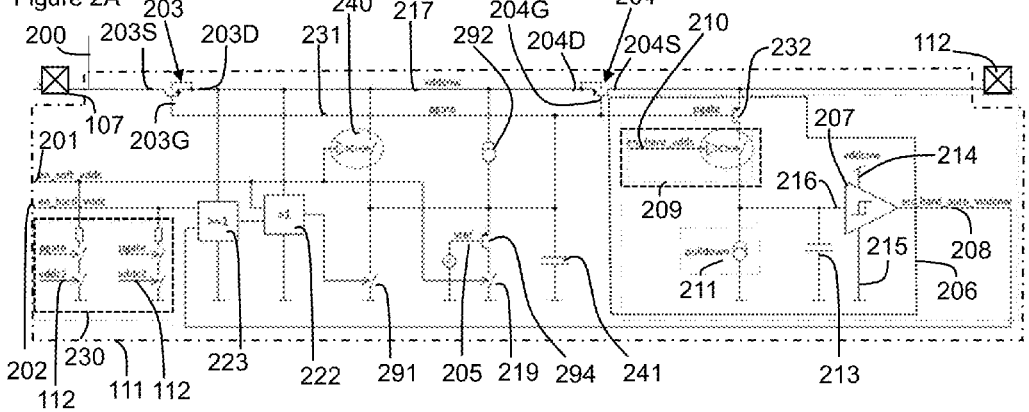
Figure 2B:
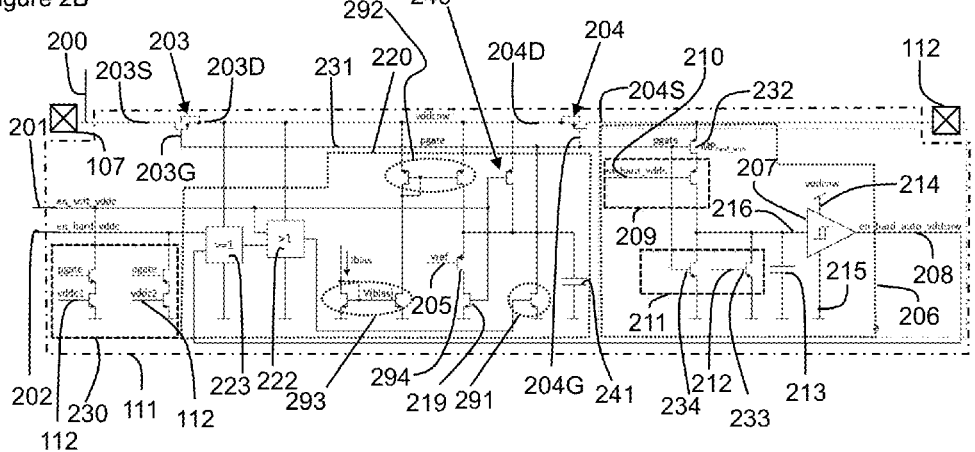

One or more embodiments will now be described by way of example only with reference to the accompanying drawings in which:

FIG. 1 shows an example embodiment of a power providing arrangement for a field power device;
FIG. 2A shows a first example embodiment of the switch;
FIG. 2B shows a second, more detailed, example embodiment of the switch;
FIG. 3 shows an example embodiment of a field powered device and a remote device;
FIG. 4 shows a timing diagram illustrating the charging of the first and second capacitors; and
FIG. 5 shows an example method.

A transponder may be used to communicate wirelessly with a remote device. The transponder may be, for example, a fob and the remote device a base station of an automotive immobilizer device. Accordingly, communication between the fob and the remote device may provide for entry to and/or starting of an automobile. Various protocols exist for communication between a fob and a remote device such as a load modulation protocol and a Charge and Talk (also presented as "Charge&Talk") protocol. The transponder, for communicating with the remote device, may use the field power of one or more wireless signals emitted by the remote device to power the transponder and communicate with/ provide a response to wireless signalling from the remote device. The transponder, in this example, may be considered a field powered device, in that it uses the power of an externally generated field (generated by the remote device) to provide a reply, such as by way of load modulation. The transponder may also be required to actively communicate with the remote device using, for example, a different signal power and/or data rate than that provided for by circuitry suitable for load modulation communication. In one or more examples, it may be advantageous for the transponder to comply with conditions, such as timing and/or signal power conditions, of load modulation based communication protocols as well as active communication protocols. While an example of an application for the transponder and remote device has been given as the automotive immobilizer field, this disclosure includes any application of a transponder and remote device to any technical application, such as Radio Frequency Identification (RF-ID) or Near-Field Communication (NFC). More generally, in one or more examples, it may be advantageous to provide a field powered device that may communicate using two or more different protocols that may demand different levels of field derived energy to power the field powered device when operating in accordance with those protocols.

In one or more examples, a transponder having circuitry suitable for load modulation based communication may have insufficient field energy storage capability for active communication. Further, in one or more examples, a transponder having field powered based energy storage suitable for active communication may not be able to charge said energy storage sufficiently quickly to comply with protocol conditions of load modulation based communication, such as response-time conditions.

FIG. 1 shows an apparatus comprising a power providing arrangement 100 for a field powered device 101 having a coil antenna 102 for receiving one or more wireless signals from one or more remote devices 300 (shown in FIG. 3). The power providing arrangement 100 is configured to, when in use, store energy from one or more wireless signals received at the coil antenna 102 in order to provide power to circuitry of the field powered device 101. The field powered device 101 may be configured to provide for transmission of wireless signalling based on load modulation of the received one or more wireless signals. The power providing arrangement 100, in this example, comprises a first capacitor 103 configured to be coupled to the coil antenna 102. In this example, a first terminal of the first capacitor 103 is coupled to the coil antenna 102 via a pre-switch 104 and a rectifier 105, which will be described in more detail below. A second terminal of the first capacitor 103 is connected to a reference voltage 106, such as ground. Thus, the first capacitor 103 is configured to store energy obtained from the wireless signal received by the coil antenna 102 up to a first stored energy level and configured to provide said energy to power the field powered device, the circuitry of which is shown generically by box 108 connected to a node 107. The circuitry 108 may, in part, comprise a voltage regulator to provide an interface with the power providing arrangement 100. The capacitance of the first capacitor 103 is such that the energy stored and therefore the power available to the field powered device 101, may be appropriate for communication using only one or more predetermined protocols. The energy that may be stored by the first capacitor 103 may be sufficient to power the field powered device 101 for communication using a first protocol such as a load modulation protocol. However, optionally, it may not be sufficient for an active communication protocol i.e. one that independently generates the wireless signals rather than by modulation of the wireless signal received from the remote device. In one or more examples, the time constant of the first capacitor 103 may be provided to be compatible with the timing conditions of the first, load modulation protocol used by the field powered device when powered by the first capacitor 103.

The power arrangement 100 in this example is provided with a second capacitor 110 for storing energy from the one or more wireless signals received at the coil antenna 102 in order to provide power to circuitry of the field powered device. The storage of energy by a combination of the first capacitor 103 and the second capacitor 110 may provide for greater stored energy for the field powered device 101 and one or more of i) greater processing of signalling from the base station, ii) greater processing of signalling to be sent to the base station iii) transmission of signalling having a different signal power, iv) transmission of signalling having a greater proportion of the signal power supplied from the power providing arrangement, and v) processing/transmitting using a higher data rate.

The power providing arrangement 100 in this example includes the second capacitor 110 arranged in parallel with the first capacitor 103 via a switch 111. A first terminal of the second capacitor 110 is connected to the switch 111, via a node 112, while a second terminal of the second capacitor 110 is connected to a reference voltage 113, such as ground.

The nodes 107, 112 may, in one or more examples, represent integrated circuit pins and the capacitors 103, 110 may be external to the other components.

The switch 111 is configured to provide at least a connected state in which the first capacitor 103 and the second capacitor 110 are connected in parallel and configured to store, in combination, the energy obtained from the wireless signal received by coil antenna 102, when in use, up to a second stored energy level greater than the first stored energy level. In the connected state the first capacitor 103 and the second capacitor 110 are configured to provide said energy to power the field powered device 101. Thus, a greater amount of energy may be stored and therefore there may be more power available for the field powered device 101 such that it can communication using other protocols, that may require greater power consumption than the one or more predetermined protocols mentioned above.

The switch 111 is configured to further provide a disconnected state in which the second capacitor 110 is disconnected from the first capacitor 103 and from the coil antenna 102.

The switch 111, in this example, is configured to transition from the disconnected state to the connected state based on particular signalling received from a remote device. The particular signalling may be received via the coil antenna 102. The particular signalling may comprise a request from the remote device to close the switch 111 and thereby provide the connected state or, more generally, the particular signalling may comprise a request from the remote device to communicate using a different, second or active communication protocol. In one or more examples, the switch 111 may be configured to directly recognise the particular signalling as such and provide for the disconnected to connected state transition. In one or more examples, the circuitry 108 may be configured to recognise the particular signalling as such and accordingly provide a control signal for causing the switch 111 to transition from the disconnected state to the connected state.

Thus, in one or more examples, the field powered device 101 may be configured to use the energy stored by the first capacitor (such as when the second capacitor is storing less energy than the first capacitor) to enable the field powered device 101 to provide for load modulation of one or more wireless signals received by the coil antenna 102 without using energy stored by the second capacitor 110. In one or more examples, the field powered device 101 may be configured to use the energy stored by both the first and second capacitor 103, 110 to enable the field powered device 101 to transmit a wireless signal with a greater wireless signal power or utilise more energy-intensive protocols.

The capacitance of the second capacitor 110 may be greater than that of the first capacitor 103. The capacitance of the second capacitor 110 may be less than that of the first capacitor 103. The capacitance of the second capacitor 110 may be substantially the same as that of the first capacitor 103. In one or more examples, the first capacitor 103 may have a capacitance of substantially 47 nF and the second capacitor may have a capacitance of substantially 220 to 330 nF. In one or more examples, the second capacitor 110 may have at least two, at least three or at least four times the capacitance of the first capacitor 103.

The optional pre-switch 104 is configured to control the charging of the capacitors when the one or more wireless signals are initially received.

The rectifier 105 is configured to rectify the one or more wireless signals received via the coil antenna 102 for providing them to the capacitors 103, 110. The coil antenna 102 (and field powered device 101) may receive energy (as described herein) from the signals received by the coil antenna 102. The coil antenna 102 (and field powered device 101) may receive commands and data from the base station via the coil antenna 102. The coil antenna 102 (and field powered device 101) may load-modulate the received constant carrier for field powered device 101 to base station communication during use of a loadmodulation protocol, for example. The coil antenna 102 (and field powered device 101) may actively transmit a signal during breaks in the receipt of a constant carrier signal (i.e. to generate carrier & modulation), such as during use of Charge and Talk protocol.

The switch 111 may be configured to provide a further state in addition to the disconnected state and connected state described above. In particular, the switch 111 may be configured to provide a current-limited-connected state in which the first capacitor 103 and the second capacitor 110 are connected in parallel and configured to both store the energy obtained from the wireless signal and wherein energy flow between the first capacitor 103 and the second capacitor 110 is controlled. The first capacitor 103 stores energy up to the first stored energy level and provides power to the field powered device 101, such as for operating by way of load modulation. On making of the parallel connection between the second capacitor 110 (which may be completely discharged) and the first capacitor 103 (which may be partially or fully charged) energy/charge will be caused to flow from the first capacitor 103 to the second capacitor 110. This flow of charge will discharge the first capacitor 103 and may discharge below a level at which it can adequately power the field powered device 101. The current-limited-connected state may be configured to prevent the energy/charge stored by first capacitor 103 dropping below a minimum-voltage threshold when the second capacitor 110 is charging. Accordingly, the current-limited-connected state may be configured to enable the first capacitor 103 to continue to provide power to the field powered device 101 even while the second capacitor 110 is charging and thereby drawing charge from the first capacitor. The connected state may differ from the current-limited-connected state in that the connected state comprises a state without said control of the energy flow i.e. a hard parallel connection between the first and second capacitors 110 or at least a connection with less current flow control, e.g. lower resistance, compared to the current-limited-connected state.

In one or more examples, the switch 111 may be configured to provide the current-limited-connected state by actively controlling the resistance of the parallel connection based on a measured voltage of the first capacitor 103 and the predetermined minimum-voltage threshold. For example, the difference between the measured voltage of the first capacitor 103 and the predetermined minimum-voltage threshold may be used to control the resistance. The resistance may be progressively increased as said difference decreases. In one or more examples, the switch 111 may be configured to provide the current-limited-connected state by allowing substantially unrestricted current flow between the first and second capacitors 103, 110 and preventing current flow based on the measured voltage of the first capacitor 103 reaching the predetermined minimum-voltage threshold. In one or more other examples not shown in the figures, the switch 111 may be configured to provide the current-limited-connected state by preventing current flow between the first capacitor 103 and the second capacitor 110 thereby requiring the second capacitor 110 to be charged solely by the energy of the wireless signal received by the coil antenna 102. Such an example may require a second switch (not shown) to connect the second capacitor 110 to provide power to the field powered device rather than connecting directly to the first capacitor 103.

In one or more examples, the switch 111 is configured to transition between the current-limited-connected state and the connected state based on a voltage across the second capacitor 110 reaching or exceeding a threshold voltage level. The threshold voltage level may comprise at least a level of charge that does not cause energy flow from the first capacitor 103 to the second capacitor 110 that would result in the voltage across the first capacitor 103 dropping below the predetermined minimum-voltage threshold. In one or more examples, the threshold voltage level may comprise a predetermined value based on how the field powered device 101 should operate. Accordingly, the switch 111 may automatically make the transition based on a measured voltage of the second capacitor 110 and the threshold voltage level. In one or more examples, the switch 111 may automatically make the transition based on the measured voltage of the second capacitor 110 and the threshold voltage level and one or more of a measured voltage of the first capacitor 103 and a measure of the power of the wireless signal.

The switch 111 may be configured to transition between the current-limited-connected state and the connected state based additionally on a control signal, which may be received from the field powered device 101. Thus, the switch 111 may be configured to make the transition based on the voltage of second capacitor 110 reaching or exceeding the threshold voltage level or the control signal from the field powered device 101. Accordingly, the field powered device 101 may be configured to control the switch 111 based on the communication requirements of the field powered device 101 at the time. This may be advantageous for saving energy as will be described below. Further, by ensuring that the level of charge at the second capacitor 110 is not exclusively responsible for control of the switch 111, safer operation may be achieved. For example, the second capacitor 110 will not accidentally reconnect to the field powered device 101, by way of triggering the switch 111 into the connected state, and restart the field powered device 101 unintentionally, such as when the field powered device has shut down.

The particular signalling may comprises a request from a remote device to the field powered device 101 to use a charge and talk protocol or for communication with a different protocol that may require a higher stored energy level, for example for a different data rate and/or wireless signal power, for at least some of time the protocol is used. Accordingly, the power providing arrangement 100 may use the energy from the wireless signal to power the field powered device 101 in a first mode, in which the switch is in the disconnected state. The first mode may comprise a load modulation mode. In response to the particular signalling from the remote device, the switch 111 (or the switch 111 under the instruction of the field powered device 101) may provide for transition to the connected state or current-limited-connected state. The particular signalling from the remote device may or may not require a response from the field powered device. In one or more examples, the field powered device 101 may remain in the first mode while the switch 111 is in the current-limited-connected state. The field powered device 101 may be configured to operate in a second mode when the switch 111 is in the connected state. The field powered device 101 may be configured to use the additional energy (up to the second stored energy level) available from the power providing arrangement 100 when the switch 111 is in the connected state to communicate with the different protocol than that used in the first mode. The greater power available from the power providing arrangement 100 in this second mode may enable the field powered device 100 to operate with a higher data rate and/or transmit signals with a greater signal power than in the first mode. The second mode may comprise a charge and talk mode in which the field powered device 101 communicates using the charge and talk protocol.

An example embodiment of an implementation of the field powered device and, in particular, the switch 111 is shown in FIG. 2A. The same reference numerals have been used for like parts. Accordingly, the nodes 107 and 112 are shown providing a connection to the switch 111. A connection 200 is shown for connection to the coil antenna 102 via the optional pre-switch 104 and rectifier 105. The switch 111 is configured to receive two control signals, illustrated by first and second terminals 201 and 202. The first control signal, received at the first terminal 201 comprises a signal to place the switch 111 in the current-limited-connected state. The first control signal may be provided based on receipt of particular signalling from the remote device, which comprises a base station in this example. The second control signal, received at the second terminal 202 comprises a signal to place the switch 111 in the connected state, which may be independent of the voltage of the second capacitor 110 being greater than the threshold voltage level. The second control signal may be used to force the connected state and switch off the current consumption of a connected-transition module 206, described below.

The switch 111 is configured to provide the disconnected state, current-limited-connected state and the connected state by control of a first transistor switch 203 and a second transistor switch 204. The transistor switches 203, 204 may include a current path between their source terminals 203S, 204S and respective drain terminals 203D, 204D controlled by a control signal applied at their respective gate terminals 203G, 204G. The transistor switches 203, 204 may be of pmos type.

The voltage of a line 217 between the first transistor switch 203 and the second transistor switch 204 is designated "vddcnw". Due to the configuration of the first transistor switch 203 and the second transistor switch 204, vddcnw comprises the higher of the voltage of the first capacitor 103, referred to as vddc, and the voltage of the second capacitor 110, referred to as vddc2. The first transistor switch 203 and the second transistor switch 204 are configured to open when the voltage at their gate is lower than at their source or drain (i.e. lower than the "effective" source; the higher of source or drain is the "effective" source). The first and second transistor switches may be symmetrical in terms of their source and drain.

A pgate line 231 connects the gates 203G, 204G of the first transistor switch 203 and the second transistor switch 204. When the voltage vddcnw on line 217 (higher of VDCC and VDDC2) is higher than a voltage at the pgate line 231, current can start to flow.

The first control signal at the first terminal 201, is provided to a first control switch 240 via a logic inverter and to a second control switch 219. The first control switch 240 provides for control of a connection between the line 217 and the pgate line 231, as described below. A third control switch 291 configured to control a connection between the pgate line 231 and a reference voltage, such as ground, receives a control signal from logic 222. In this example, the third control switch 291 is arranged between the first control switch 240 and the reference voltage (ground). The second control switch 219 provides for control of a connection to the reference voltage, such as ground, of a current-limiting arrangement.

The current-limiting arrangement comprises a current source 292 connected between the line 217 and ground via a source follower 294 and the second control switch 219. A node between the current source 292 and source follow 294 provides for connection to a node between the first control switch 240 and the third control switch 291 as well as a connection to a node between the pgate line 231 and ground (via a capacitor 241).

The disconnected state is provided by the gate 203G and 204G being provided with a higher or equal voltage relative to the drain 203D, 204D and source 203S, 204S. Thus, without the first control signal at terminal 201, the first control switch 240 (inverted logic) is closed and therefore pulls up the voltage at the pgate line 231 to the voltage vddcnw of the line 217 and therefore the current channels of the switches 203 and 204 are in disconnected state.

The current limited connected state is provided when the first control signal at terminal 201 is provided. Accordingly, the first control switch 240 is open and the second control switch 219 is closed. The second control switch 219 enables current flow through the source follower 294, together with the current flow from current source 292 and provides for an intermediate voltage (between vddcnw and the reference voltage, ground) at the pgate line 231. In particular, the intermediate voltage comprises one switch voltage threshold Vth above a reference voltage (vref) 205. Accordingly, limited current flow between the first capacitor 103 and the second capacitor 110 is provided.

In the connected state the third control switch 291 is closed based on a control signal from the logic 222. The logic 222 is configured to provide the control signal based on the first control signal being provided at 201 and a connected state trigger signal received from OR logic 223. The OR logic is configured to provide the connected state trigger signal based on the voltage of the second capacitor 110 reaching a threshold or the second control signal being provided at 202. The third control switch 291 causes the pull down of the voltage at pgate line 231 to the reference voltage, such as ground. Accordingly, the current channels of the transistor switches 203 and 204 are provided in a connected state. The pulling down of the voltage at the pgate line 231 to ground leads to the gate-source voltage of the first transistor switch 203 and the second transistor switch 204 becoming equal to vddcnw.

The OR logic 223 is provided with a trigger signal indicative of the voltage of the second capacitor 110 reaching the threshold voltage level from a connected-transition module 206.

The automatic switching to the connected state is, in this example, independent of the second control signal 202 being provided. This is advantageous because it means the switch 111 does not need components to provide a timer that is configured to count to a time when the connected state can be provided. Instead the transition to the connected state from the current-limited-connected state is simply based on the speed of charging of the second capacitor 110, which is measured by the connected-transition module 206.

The connected-transition module 206 comprises a transistor 232 with its source connected to node 112 and therefore to the voltage vddc2 across the second capacitor 110 and its drain connected to a pulldown structure 211 via an override switch 209. The gate of the transistor 232 is connected to the pgate line 231. The pull down structure 211 may be a biased (better control) or (more generally) a weak pulldown structure.

The transistor 232 provides for pulling up of the voltage based upon the voltage vddc2 in relation to a threshold, on the other side, the pulldown structure 211 pulls the voltage down. A node between the transistor 232 and the pulldown structure 211 is provided as an input signal 216 to a Schmitt trigger 207. Equality of the pullup and the pulldown current defines the threshold at which the switch 111 transitions between the current-limited-connected state and the connected state. The Schmitt trigger 207 is configured to provide a trigger signal at output 208 to apply a signal to the OR logic 223 which, as described above, provides for placing of switch in the connected state. The Schmitt trigger 207 is configured to receive a supply voltage vddcnw at a first supply terminal 214 and connect to a reference voltage such as ground at second supply terminal 215. The voltage between the transistor 232 and the pull down structure 211 provides the input signal to the Schmitt trigger 207 at input terminal 216. The Schmitt trigger 214 is configured to provide its trigger signal subject to the voltage at the second capacitor 110 being above the threshold voltage level, which in this example is the voltage at the second capacitor 110 being substantially equal to the voltage at the first capacitor 103. It will be appreciated that by sizing of the transistor 232 and the pull down structure 211, the threshold can be adjusted within a limited range.

The connected-transition module 206, in this example, includes an override module 209 to enable/disable the automatic triggering of the current-limited-connected state to connected state transition provided for by the Schmitt trigger 207. The override module 209 is thereby configured to save current used by the connected-transition module 206 as the connected state may be provided by way of the second control signal without the transition by way of the threshold voltage level. Accordingly, the override module 209 is configured to receive the second control signal at input 210. It will be appreciated that the second control signal and the control provided by the override module 209 is optional in one or more embodiments.

FIG. 2B shows a second embodiment of the switch 111 and the same reference numerals have been used for like parts. The principle of operation is the same as described above in relation to FIG. 2A and the differences will be described below.

The first control switch 240 is provided as a pmos transistor. The second control switch 219 and the third control switch 291 are provided by nmos transistors. The current source 292 of FIG. 2A is implemented as parts 292 and 293 comprising a current mirror arrangement in FIG. 2B. The source follower 294, comprising an nmos transistor, is shown receiving a reference voltage rather than showing a voltage source as in FIG. 2A. The voltage source may be implemented as a limb of a current mirror arrangement in one or more examples (not shown).

As mentioned above the voltage vddcnw on line 217 comprises the higher of the voltage of the first capacitor 103, referred to as vddc, and the voltage of the second capacitor 110, referred to as vddc2, by virtue of the transistor switches 203, 204 comprising well diodes.

The reference voltage "vref" 205 is level-shifted by the nmos source follower 294 one switch threshold "Vth" higher than the voltage at the pgate line 231 by way of an operating current from current mirror arrangement 292 and 293. A first part 292 of the current mirror arrangement is connected to the line 217 voltage vddcnw. A second part 293 of the current mirror arrangement connects to the first current mirror 292 and a bias current (labelled (bias).

The pulldown structure 211 is configured to reduce the chance of the Schmitt trigger 207 providing the trigger signal in the event of current leakage in the connected-transition module 206. In FIG. 2B, the pulldown structure 211 comprises a first pulldown transistor 233 and a second pulldown transistor 234. The first pulldown transistor 233 of pulldown structure 211 receives a bias voltage at its gate 212. The second pulldown transistor 234 has its gate connected to the pgate line 231. The pulldown structure 211 effectively forms part of a current mirror. The pull down structure is configured to provide, using the bias voltage, a reference level for the connected-transition module 206 to obviate the effect of current leakage.

The connected-transition module 206 further includes an optional low-pass filter 213 to filter the input to the Schmitt trigger resulting in a more reliable trigger output in response to the voltage of the second capacitor 110 reaching or exceeding a threshold voltage level.

The switch 111 further includes an optional self-locking module 230. The self-locking module 230 is configured to prevent accidental closing of the switch 111 to the connected state when a voltage vddc2 at the second capacitor 110 is still present but a voltage vddc of the first capacitor 103 is mostly discharged. The self-locking module 230, in this example, pulls the two logic, control input signals at terminals 201, 202 from the "undefined power domain" defined by the voltage vddc of the first capacitor 103 down to a reference voltage, such as ground, when there is still a second capacitor 110 voltage vddc2 present and a pgate signal at line 231 is high (i.e. same level as vddc2), which is the case when the switch 111 is in the open or disconnected state. The self-locking module comprises a first pair of transistors (or switches in FIG. 2A) and a second pair of transistors, each pair connected in series. The first pair are connected to the terminal 201 and the second pair are connected to the terminal 202. One of the transistors of the pairs receives the voltage at the pgate line 231 at its gate terminal and the other of the transistors of the pairs receives the vddc2 voltage at its gate terminal.

FIG. 3 shows an automotive immobilizer fob 301 comprising an example use of the field powered device 101. Accordingly, the field powered device 101 and the power providing arrangement 100 is shown as part thereof, the power providing arrangement 100 connected to coil antenna 102. The field powered device 101, exemplified as the automotive immobilizer fob 301, is configured to communicate with the remote device 300, which in this example is termed a base station and may comprise a complimentary part of the automotive immobilizer in the automobile. The base station 300 may be configured to initially communicate with the field powered device 101 by way of a first protocol, such as a load modulation protocol. The field powered device 101 may send a return signal to the base station 300 using the first/load modulation protocol. The field powered device may therefore be considered to be in a first protocol mode or load modulation mode with the switch 111 in the disconnected state. The base station 300 may be configured to continue communication with the field powered device 101 using a different, second protocol and, accordingly, may send the particular signalling to request that the field powered device communicates therewith using the different second protocol which may require more energy. Accordingly, the particular signalling is interpreted by the field powered device 101 as a request to instruct the switch 111, by way of the first control signal at terminal 201, to transition from the disconnected state to the current-limited-connected state so that the second capacitor 110 can begin charging. The base station 300 may be configured to wait a predetermined time, perhaps based on a determination of the amount of time the second capacitor 110 takes to charge. The base station 300 and field powered device 101 may continue to communicate using the first/load modulation protocol while the switch 111 is in the current-limited-connected state. Upon the voltage of the second capacitor 110 reaching the threshold voltage level, the field powered device 101 and the base station 300 may communicate using the different, second protocol, which may use the additional energy stored in the second capacitor 110 to communicate with the base station 300. The field powered device 101 may therefore be considered to be in a second protocol mode or Charge and Talk mode with the switch 111 in the connected state. Accordingly, the base station 300 may control the closing of the switch 111 using the particular signalling and therefore control the communication protocol that is used by the field powered device 101 and base station 300. Accordingly, the field powered device 101 may be able to operate more flexibly using energy from one or more wireless signals stored by one or two capacitors and using different protocols that may have different energy usage requirements and/or time limits on the sending of reply messages.

It will be appreciated that the particular signalling may be provided without first communicating using the first protocol. For example, the base station may request, using the particular signalling, that communication is by way of the second protocol. The particular signalling itself may be of a form in accordance with the second protocol, although it may be in a form in accordance with the first protocol or any other protocol.

The field powered device 101 may, in one or more examples, be configured to determine the level of charge on the second capacitor 110 on or after transition of the switch 111 to the disconnected state. If there is sufficient residual charge stored in the second capacitor 110, that energy may be used when the field powered device next needs to communicate in the first protocol mode or load modulation mode. Thus, rather than wait for the first capacitor 103 to charge from the wireless signal(s) (and with charge transfer from the second capacitor), the field powered device 101 may be configured to transition the switch 111 to the connected state from the disconnected state so that communication using the first protocol (e.g. the load modulation protocol) can commence using the energy of the second capacitor 110. Once the residual energy of the second capacitor has been used, the field powered device 101 may provide for transition of the switch 111 back to the disconnected state to continue communication using the first, load modulation, protocol. This reduces the capacitance receiving charge from the one or more wireless signals enabling more timely operation given a smaller capacitance is charged with energy in the disconnected state. It will be appreciated that in other examples, the switch 111 may remain in the connected state. How the switch behaves may be dependent on which protocol the base station wishes to use for communication.

In the above examples, capacitors are used to store the energy of the one or more wireless signals received by the coil antenna, however the term capacitor is intended to cover any suitable energy storage device. Further, in the above examples, one capacitor 103 is provided in the disconnected state for receiving energy and two capacitors 103 and 110 is provided in at least the connected state for receiving energy. However, in one or more examples, a plurality of capacitors may be provided in the disconnected state and a combined, greater number of capacitors in at least the connected state. Thus, the disconnected state provides at least the first capacitor 103 and the connected state provides at least the first capacitor and at least the second capacitor 103, 110 for storing energy.

FIG. 4 shows a graph 400 illustrating the voltages across the first and second capacitors 103, 110 with respect to time during operation. Plot 401 shows the voltage VDDC across the first capacitor 103. Plot 402 shows the voltage VDDC2 across the second capacitor 110.

At point 404 the one or more signals, such as from the remote device, are received. This may activate analogue circuitry associated with the coil antenna 102. A counter of the pre-switch 104 is started at point 405 and, provided that the one or more signals continue to be received for a predetermined time period (2 ms in this example), the pre-switch 104 is closed to connect the power providing arrangement 100 to the coil antenna 102 for receiving energy therefrom at point 406. It will be appreciated that prior to point 406, the apparatus may operate differently. The VDDC voltage increases as the first capacitor 103 charges shown by plot 401 increasing between point 406 and 407. At point 407 a minimum-first-capacitor-voltage threshold is reached and the power providing arrangement is configured to provide power to the field powered device 101. At point 408 the base station may start to send signalling to the field powered device, which may be a command that does not require a response from the device and triggers the closing the switch 111 or which may be responded to by transmitting one or more signals using the first protocol, such as a load modulation protocol. At point 409, the field powered device receives the particular signalling from the remote device and provides for control of the switch 111 to transition to the current-limited-connected state. Accordingly, the voltage across the first capacitor 103 decreases as charge/energy is transferred to the second capacitor 110. At point 410, the minimum-voltage threshold of the first capacitor 103 is reached, shown as voltage level 411. Accordingly, the charging of the second capacitor 110 is shown to slow in plot 402. At point 412 the voltage across the second capacitor 110 has reached the threshold voltage level, which in this example, happens to be the same as the minimum-voltage threshold of the first capacitor 103. Accordingly, the switch 111 automatically transitions from the current-limited-connected state to the connected state. Post point 412 the first capacitor and the second capacitor charge together, the energy stored thereby utilised by the field powered device 101.

FIG. 5 illustrates an example method comprising the steps of providing 501 for the charging of a first capacitor from a wireless signal received by a coil antenna, up to a first stored energy level, for providing energy to power a field powered device; and based on particular signalling received from a remote device;

providing 502 for transition of a switch from a disconnected state to a connected state, wherein in the connected state the first capacitor and a second capacitor are connected in parallel and configured to both store the energy obtained from the wireless signal, up to a second stored energy level, greater than the first stored energy level, for providing said energy to power the field powered device and wherein in the disconnected state the second capacitor is disconnected from the first capacitor.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a power providing arrangement for a field powered device having a coil antenna for receiving a wireless signal, the power providing arrangement comprising:
   a first capacitor configured to be coupled to the coil antenna, the first capacitor configured to store energy obtained from the wireless signal received by the coil antenna, up to a first stored energy level, and configured to provide said energy to power the field powered device;
   a second capacitor arranged in parallel with the first capacitor via a switch;
   the switch providing at least a connected state in which the first capacitor and the second capacitor are connected in parallel and configured to both store the energy obtained from the wireless signal up to a second stored energy level, greater than the first stored energy level, and configured to provide said energy to power the field powered device and a disconnected state in which the second capacitor is disconnected from the first capacitor;
   the switch configured to transition from the disconnected state to the connected state based on particular signalling received from a remote device.

2. The apparatus of claim 1, wherein the switch is further configured to provide a current-limited-connected state in which the first capacitor and the second capacitor are connected in parallel and configured to both store the energy obtained from the wireless signal and wherein energy flow between the first capacitor and the second capacitor is controlled based on a minimum-voltage threshold of the first capacitor; and
   wherein the connected state comprises a state without said control of the energy flow.

3. The apparatus of claim 2, wherein the switch is configured to transition between the current-limited-connected state and the connected state based on a voltage of the second capacitor reaching a threshold voltage level.

4. The apparatus of claim 2, wherein the switch is configured to transition between the current-limited-connected state and the connected state based on;
   (a) a voltage of the second capacitor reaching or exceeding a threshold voltage level; or
   (b) a control signal from the field powered device.

5. The apparatus of claim 3, wherein the transition between the current-limited-connected state and the connected state based on the voltage of the second capacitor reaching the threshold voltage level is provided for by a Schmitt trigger.

6. The apparatus of claim 2, wherein the switch includes a pair of transistor switches and the connected state is provided by a closed state of both the transistor switches, the disconnected state is provided by an open state of both the transistor switches and the current-limited-connected state is provided by control of a voltage dependent conductance of a current path through the transistor switches.

7. The apparatus of claim 1, wherein the switch includes a self-locking module configured to prevent transition of the switch to the connected state when a voltage at the second capacitor is greater than the voltage at the first capacitor.

8. The apparatus of claim 2, wherein the switch is absent of a timer to control the transition between the current-limited connected state and the connected state.

9. A field powered device comprising the power providing arrangement of claim 1, the field powered device configured to provide for the wireless transmittal of one or more signals in accordance with a first protocol when the switch is in the disconnected state and configured to provide for the wireless transmittal of one or more signals in accordance with a second, different protocol when the switch is in the connected state.

10. The field powered device of claim 9, wherein the field powered device is configured to operate in;
   a load modulation protocol mode in which the switch is in the disconnected state and the one or more wireless signals are transmitted by load modulation;
   a charge and talk protocol mode in which the switch is in the connected state and the one or more wireless signals comprise signals in accordance with charge and talk protocol.

11. The field powered device of claim 9, wherein the field powered device is configured to provide for the wireless transmittal of one or more signals in accordance with the first protocol when the switch is in the current-limited-connected state.

12. The field powered device of claim 9, wherein the field powered device is configured to, based on the second capacitor having energy stored therein when the switch is in the disconnected state, provide for switching of the switch to the connected state to provide power to the field powered device based on energy stored in the second capacitor, the field powered device configured to use said energy to provide for wireless transmittal of one or more signals in accordance with the first or second protocol.

13. An automotive immobilizer fob comprising the field powered device of claim 9.

14. A method comprising:
   providing for the charging of a first capacitor from a wireless signal received by a coil antenna, up to a first stored energy level, for providing energy to power a field powered device; and
   based on particular signalling received from a remote device;
   providing for transition of a switch from a disconnected state to a connected state, wherein in the connected state the first capacitor and a second capacitor are connected in parallel and configured to both store the energy obtained from the wireless signal, up to a second stored energy level, greater than the first stored energy level, for providing said energy to power the field powered device, and wherein in the disconnected state the second capacitor is disconnected from the first capacitor.

15. A remote device for communicating with the field powered device of claim 9, the remote device configured to provide for transmission of the particular signalling to request that the field powered device communicates therewith using a second protocol different to a default, first protocol used by the field powered device, the particular signalling configured to provide for the actuation of a switch of the field powered device to provide for the storage of energy from one or more wireless signals transmitted by the remote device by at least one additional capacitor compared to prior to transmission of the particular signalling.

* * * * *